United States Patent
Pang et al.

(10) Patent No.: US 9,127,980 B2
(45) Date of Patent: Sep. 8, 2015

(54) METHOD AND STRUCTURE FOR INCREASING RECEIVING ANGLE OF OPTICAL SENSOR AND HANDHELD TERMINAL

(71) Applicant: Huawei Device Co., LTD, Shenzhen (CN)

(72) Inventors: Leilei Pang, Shenzhen (CN); Hui Shao, Shenzhen (CN)

(73) Assignee: Huawei Device Co., LTD, Shenzhen (CN)

( * ) Notice: Subject to any disclaimer, the term of this patent is extended or adjusted under 35 U.S.C. 154(b) by 122 days.

(21) Appl. No.: 13/960,176

(22) Filed: Aug. 6, 2013

(65) Prior Publication Data

US 2014/0103816 A1     Apr. 17, 2014

(30) Foreign Application Priority Data

Oct. 15, 2012    (CN) .......................... 2012 1 0389982

(51) Int. Cl.
| | |
|---|---|
| H05B 37/02 | (2006.01) |
| H05B 39/04 | (2006.01) |
| G01J 1/02 | (2006.01) |
| G02F 1/1333 | (2006.01) |
| G09G 5/10 | (2006.01) |
| G01J 1/04 | (2006.01) |
| G01J 1/42 | (2006.01) |
| H04M 1/02 | (2006.01) |

(52) U.S. Cl.
CPC ............. *G01J 1/0233* (2013.01); *G01J 1/0474* (2013.01); *G01J 1/4204* (2013.01); *G02F 1/13338* (2013.01); *G09G 5/10* (2013.01); *H04M 1/026* (2013.01); *H04M 2250/12* (2013.01)

(58) Field of Classification Search
USPC ................................................. 315/149–159
See application file for complete search history.

(56) References Cited

U.S. PATENT DOCUMENTS

| | | |
|---|---|---|
| 2003/0127583 A1 | 7/2003 | Bechtel et al. |
| 2008/0001912 A1 | 1/2008 | Koide et al. |
| 2010/0187426 A1 | 7/2010 | Young et al. |
| 2010/0282953 A1 | 11/2010 | Tam |
| 2010/0283394 A1 | 11/2010 | Ong |

(Continued)

FOREIGN PATENT DOCUMENTS

| | | |
|---|---|---|
| EP | 2249136 A2 | 11/2010 |
| JP | 2008033238 A | 2/2008 |

(Continued)

OTHER PUBLICATIONS

International Search Report and Written Opinion received in Application No. PCT/CN2013/085090 mailed Jan. 16, 2014, 13 pages.

(Continued)

*Primary Examiner* — Brandon S Cole
(74) *Attorney, Agent, or Firm* — Slater & Matsil, L.L.P.

(57) ABSTRACT

A method and a structure are provided to increase a receiving angle of an optical sensor. The structure includes touchscreen glass, an optical sensor, and a main board. An ambient light hole is provided on the touchscreen glass. The optical sensor is disposed between the touchscreen glass and the main board. A light uniformizing film is disposed between the touchscreen glass and the optical sensor, is in contact with the touchscreen glass, and completely covers the ambient light hole. A handheld terminal includes the foregoing structure.

17 Claims, 3 Drawing Sheets

(56) References Cited

U.S. PATENT DOCUMENTS

| | | | |
|---|---|---|---|
| 2011/0227487 A1* | 9/2011 | Nichol et al. | 315/158 |
| 2012/0069042 A1 | 3/2012 | Ogita et al. | |
| 2013/0270998 A1* | 10/2013 | Pi | 315/51 |
| 2014/0103816 A1* | 4/2014 | Pang et al. | 315/158 |

FOREIGN PATENT DOCUMENTS

| | | |
|---|---|---|
| JP | 2009017306 A | 1/2009 |
| JP | 2010212204 A | 9/2010 |
| JP | 2011220769 A | 11/2011 |
| JP | 2012070356 A | 4/2012 |
| JP | 2012083592 A | 4/2012 |
| WO | 2006109140 A1 | 10/2006 |
| WO | 2012020594 A1 | 2/2012 |

OTHER PUBLICATIONS

Ryer, Alex, "Light Measurement Handbook," International Light, Dec. 31, 1998, 64 pages.

Extended European Search Report received in Application No. 13180204.3-1507 mailed Apr. 10, 2014, 9 pages.

Low Power Ambient Light and Proximity Sensor with Internal IR-LED and Digital Output, Intersil, Feb. 9, 2012, 16 pages.

SFH 7773 (IR-LED + Proximity Sensor + Ambient Light Sensor) Opto Semiconductors, Dec. 12, 2011, 24 pages.

* cited by examiner

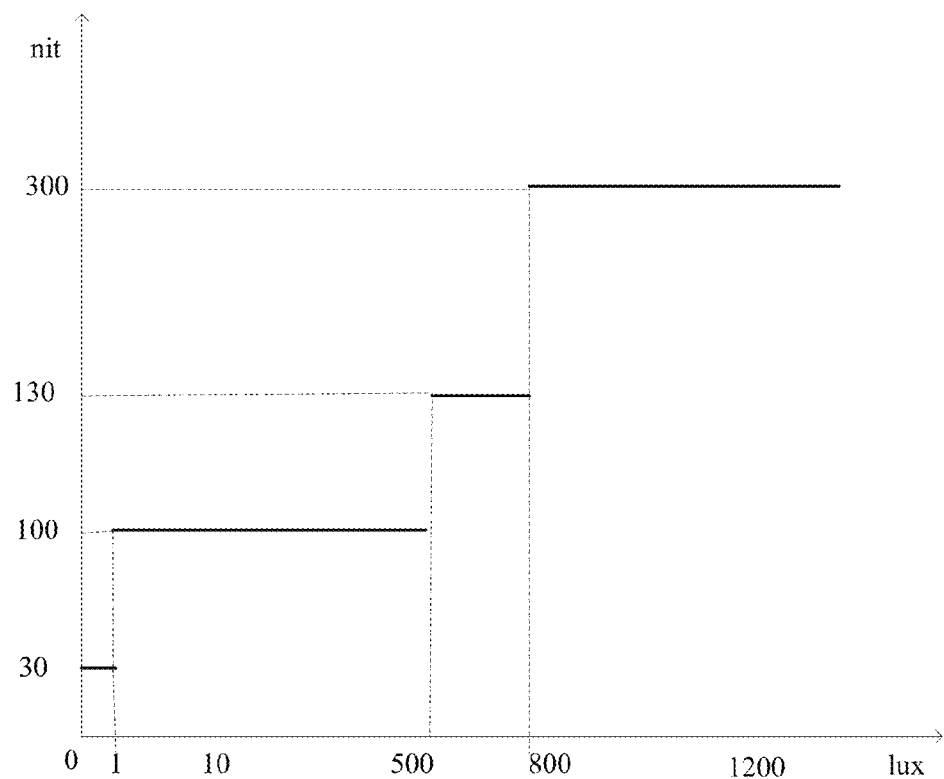
FIG. 3
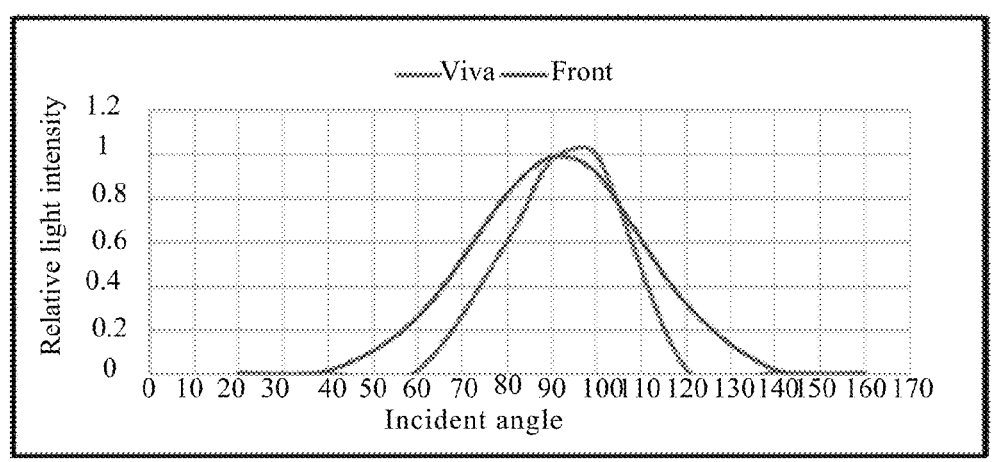
FIG. 3.1

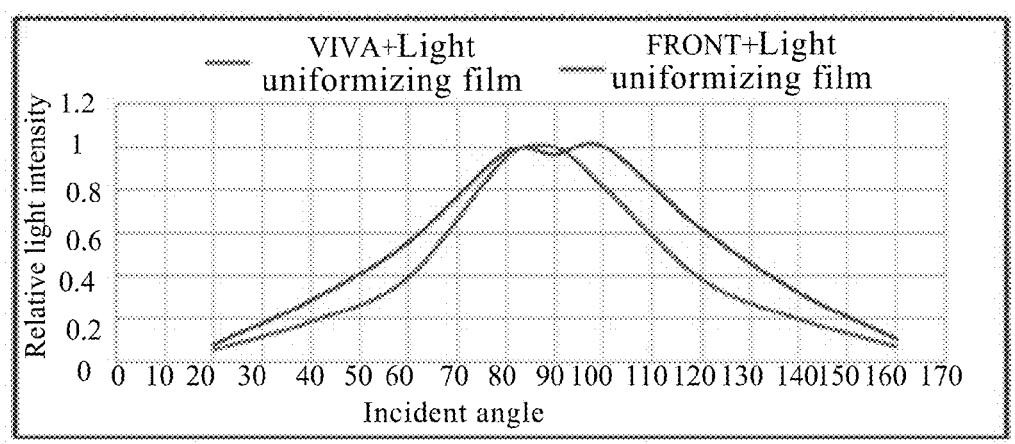
FIG. 3.2

METHOD AND STRUCTURE FOR INCREASING RECEIVING ANGLE OF OPTICAL SENSOR AND HANDHELD TERMINAL

CROSS-REFERENCE TO RELATED APPLICATIONS

This application claims priority to Chinese Patent Application No. 201210389982.9, filed on Oct. 15, 2012, which is hereby incorporated by reference in its entirety.

TECHNICAL FIELD

The present invention relates to the field of handheld terminals, and in particular, to a method and a structure for increasing a receiving angle of an optical sensor, and a handheld terminal.

BACKGROUND

Currently, optical sensors are widely applied to touchscreen mobile phones. An optical sensor receives external ambient light and controls brightness of a display of a mobile phone by sensing intensity of the external ambient light. When a user uses a mobile phone, external ambient light is incident from different directions. Because there is a certain limitation on an angle for the optical sensor to receive light, and a glass structure of a touchscreen also affects the angle for the optical sensor to receive light, a light receiving angle of the whole mobile phone is relatively small, thereby affecting the brightness of the display of the mobile phone under different external ambient light.

In order to increase a receiving angle of the optical sensor, currently, one technique is to print light uniformizing ink on a glass ambient light hole of the touchscreen, and another technique is to add a light guiding column between the glass ambient light hole of the touchscreen and the optical sensor.

During a process of implementing the foregoing technical solutions, the inventor finds that the prior art has at least the following problems:

On one hand, printing the light uniformizing ink on the glass ambient light hole of the touchscreen to increase the receiving angle of the optical sensor reduces a yield rate of the touchscreen; on the other hand, adding the light guiding column between the glass ambient light hole of the touchscreen and the optical sensor to increase the receiving angle of the optical sensor increases assembling difficulty. Meanwhile, both methods cost highly.

SUMMARY

Embodiments of the present invention provide a method and a structure for increasing a receiving angle of an optical sensor, and a handheld terminal, which increase a receiving angle of an optical sensor, and realize simple assembly and low cost.

To achieve the preceding objectives, the embodiments of the present invention adopt the following technical solutions:

In a first aspect, a structure for increasing a receiving angle of an optical sensor is provided, where the structure includes touchscreen glass, an optical sensor, and a main board, an ambient light hole is provided on the touchscreen glass, the optical sensor is disposed between the touchscreen glass and the main board, and a light uniformizing film is disposed between the touchscreen glass and the optical sensor, is in contact with the touchscreen glass, and completely covers the ambient light hole.

In a second aspect, a handheld terminal is provided, where the handheld terminal includes a casing and further includes the foregoing structure for increasing a receiving angle of an optical sensor; and the touchscreen glass in the structure for increasing a receiving angle of an optical sensor is embedded in the casing, and the main board in the structure for increasing a receiving angle of an optical sensor is fixed inside the casing.

In a third aspect, a method for increasing a receiving angle of an optical sensor is provided, where the method includes:

collecting, by a light uniformizing film, incident external ambient light passing through touchscreen glass, and conducting the incident external ambient light to an optical sensor, and controlling, by the optical sensor, brightness of a liquid crystal display LCD according to intensity of the received light.

In a fourth aspect, a method for assembling a light uniformizing film is provided, where the method includes:

fixing a liquid crystal display LCD and touchscreen glass module;

approaching a light uniformizing film to and aligning the light uniformizing film with an ambient light hole on touchscreen glass;

jointing the light uniformizing film and the touchscreen glass; and pressing the touchscreen glass, so that the light uniformizing film and the touchscreen glass are in complete contact.

In the method and the structure for increasing a receiving angle of an optical sensor, and the handheld terminal provided by the embodiments of the present invention, external ambient light passes through touchscreen glass and is incident on a light uniformizing film, and the light uniformizing film collects the external ambient light and conducts the external ambient light to an optical sensor. Because the light uniformizing film contains light uniformizing particles, and the light uniformizing particles are capable of receiving light incident from different directions, a receiving angle of the optical sensor is increased; and an operation method for sticking a light uniformizing film is simple. Therefore, not only a yield rate of the touchscreen glass is improved, but also cost is low.

BRIEF DESCRIPTION OF DRAWINGS

FIG. 3 is a diagram of a relationship between light intensity sensed by an optical sensor and brightness of a liquid crystal display according to an embodiment of the present invention;

FIG. 3.1 is a diagram of a receiving range in which optical sensors of two types of handheld terminals receive incident light when a light uniformizing film is not added according to an embodiment of the present invention; and FIG. 3.2 is a diagram of a receiving range in which optical sensors of two types of handheld terminals receive incident light when a light uniformizing film is added according to an embodiment of the present invention.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
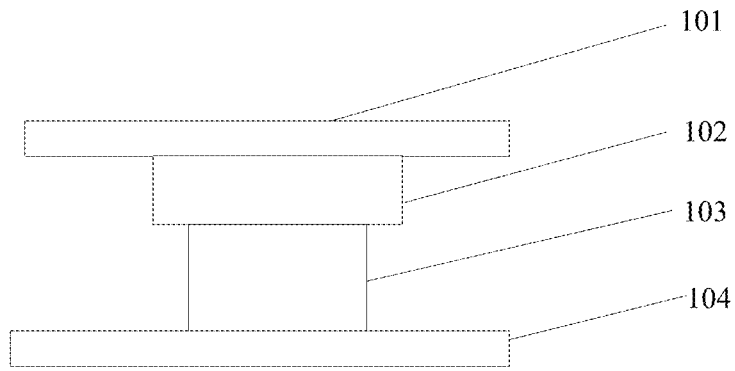
FIG. 1 is a diagram of a structure for increasing a receiving angle of an optical sensor according to an embodiment of the present invention.

The present invention provides a structure for increasing a receiving angle of an optical sensor, and as shown in FIG. 1, the structure includes touchscreen glass 101, a light uniformizing film 102, an optical sensor 103, and a main board 104.

The touchscreen glass 101 is at the topmost side of the structure and is provided with an ambient light hole; the light uniformizing film 102 is between the touchscreen glass 101 and the optical sensor 103; the optical sensor 103 is between the light uniformizing film 102 and the main board 104; the light uniformizing film 102 is in contact with the touchscreen glass 101; and the main board 104 is at the bottom side of the structure.

The light uniformizing film 102 contains a Teflon material, and the Teflon material contains light uniformizing particles. The light uniformizing particles are capable of receiving light incident from different directions, so that a receiving angle of the optical sensor is increased.

The foregoing structure for increasing a receiving angle of an optical sensor is disposed in a handheld terminal, where the touchscreen glass 101 is embedded in a casing of the handheld terminal, and the main board 104 is fixed inside the casing.

Steps for sticking a layer of light uniformizing film 102 between the touchscreen glass 101 and the optical sensor 103 are as follows:

First, use tweezers to pick up the light uniformizing film 102; and then, fix an LCD (liquid crystal display, liquid crystal display) and touchscreen glass 101 module, approach the light uniformizing film 102 to the ambient light hole on the touchscreen glass 101, align the light uniformizing film 102 with the ambient light hole on the touchscreen glass 101, and it should be noted that the light uniformizing film 102 must not be exposed to the edge of the touchscreen glass 101; and finally, joint the light uniformizing film 102 and the touchscreen glass 101, and press the touchscreen glass 101, so that the light uniformizing film 102 and the touchscreen glass 101 are in complete contact.

It can be seen from the foregoing steps for sticking a layer of light uniformizing film between the touchscreen glass and the optical sensor to increase the receiving angle of the optical sensor that an operation method for sticking a light uniformizing film is simple, and cost is low.

Figure 2:
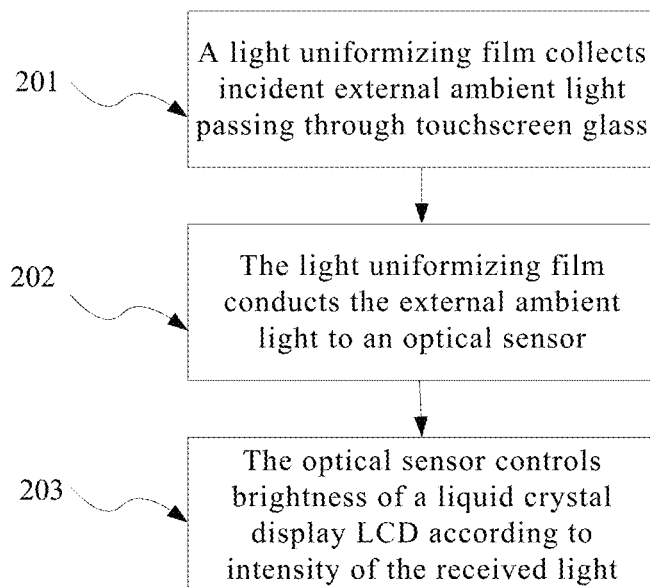
FIG. 2 is a flowchart of a method for increasing a receiving angle of an optical sensor according to an embodiment of the present invention.

An embodiment of the present invention further provides a method for increasing a receiving angle of an optical sensor, and as shown in FIG. 2, the method includes:

201: A light uniformizing film collects incident external ambient light passing through touchscreen glass.

When a user uses a handheld terminal, external ambient light passes through the touchscreen glass of the handheld terminal. Because the light uniformizing film is stuck to the lower side of the touchscreen glass, after external ambient light passes through the touchscreen glass, the light uniformizing film collects incident external ambient light passing through the touchscreen glass.

202: The light uniformizing film conducts the external ambient light to an optical sensor.

A material of the light uniformizing film contains light uniformizing particles, and the light uniformizing particles are capable of receiving light incident from different directions. Therefore, the light uniformizing film may collect incident external ambient light passing through the touchscreen glass from different directions. After collecting incident external ambient light passing through the touchscreen glass, the light uniformizing film conducts the collected external ambient light to the optical sensor.

203: The optical sensor controls brightness of an LCD according to intensity of the received light.

After receiving the light conducted by the light uniformizing film, the optical sensor senses the intensity of the received light, and control the brightness of the LCD according to the sensed light intensity.

Specifically, in step 203, first, determine, according to preset correspondence between light intensity and brightness, brightness data corresponding to the intensity of the received light; and then, adjust the brightness of the LCD according to the brightness data. For example, the correspondence between the light intensity and the brightness is shown in FIG. 3, and in this figure, the Y-axis nit represents brightness nit of an LCD and the X-axis lux represents light intensity lux sensed by an optical sensor. It can be known from this figure that when the light intensity sensed by the optical sensor ranges from 0 to 1 lux, the brightness of the LCD is 30 nit; when the light intensity sensed by the optical sensor ranges from 1 to 500 lux, the brightness of the LCD is 100 nit; when the light intensity sensed by the optical sensor ranges from 500 to 800 lux, the brightness of the LCD is 130 nit; and when the light intensity sensed by the optical sensor is greater than 800 lux, the brightness of the LCD is 300 nit. Therefore, it can be seen that the greater the light intensity sensed by the optical sensor is, the greater a value of the brightness of the LCD is, and vice versa. In the embodiment of the present invention, a light uniformizing film is added, so that an optical sensor can accurately sense intensity of external ambient light within a light incident angle range that is as large as possible, and control brightness of an LCD by sensing the intensity of the external ambient light.

A diagram of a relationship between light intensity sensed by an optical sensor and brightness of an LCD according to an embodiment of the present invention is merely a reference diagram. In an actual application scenario, the relationship between the light intensity sensed by the optical sensor and the brightness of the LCD may vary correspondingly according to differences of external environments. Persons skilled in the art may easily derive modifications or replacements within the technical scope disclosed in the present invention, and therefore, details are not repeatedly described here.

FIG. 3.1 shows a receiving angle of an optical sensor when a light uniformizing film is not stuck between touchscreen glass and the optical sensor. FIG. 3.2 shows a receiving angle of an optical sensor when a light uniformizing film is stuck between touchscreen glass and the optical sensor.

Horizontal axes of both FIG. 3.1 and FIG. 3.2 represent a receiving angle of an optical sensor, and vertical axes represent a light energy attenuation percentage. It can be known by comparing FIG. 3.1 and FIG. 3.2 that, in FIG. 3.1, it is required that relative light intensity is no less than 20%, a receiving angle of a first type of handheld terminal is from 57° to 126°, totally 69° of receiving range, and a receiving angle of a second type of handheld terminal is from 67° to 115°, totally 48° of receiving range.

In FIG. 3.2, it is also required that relative light intensity is no less than 20%, a receiving angle of a first type of handheld terminal is 32° to 151°, totally 119° of receiving range, and a receiving angle of a second type of handheld terminal is 41° to 138°, totally 97° of receiving range. It can be known from a comparison between not adding a light uniformizing film and adding a light uniformizing film that, when the relative light intensity is no less than 20%, the receiving range of the angle of the first type of handheld terminal increases by 50° and the receiving range of the angle of the second type of handheld terminal increases by 49°. It can be seen from comparison results that both the first type of handheld terminal and the second type of handheld terminal may largely increase the receiving angle of the optical sensor after the light uniformizing film is added.

The receiving angle of the optical sensor is increased by sticking the light uniformizing film between the touchscreen glass and the optical sensor, not only assembly is simple, but also a yield rate of the touchscreen glass is increased, and cost is low.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A structure, comprising:
   touchscreen glass;
   an ambient light hole provided on the touchscreen glass;
   a main board;
   an optical sensor disposed between the touchscreen glass and the main board; and
   a light uniformizing film disposed between the touchscreen glass and the optical sensor, the light uniformizing film in contact with the touchscreen glass and completely covering the ambient light hole.

2. The structure according to claim 1, wherein the light uniformizing film contains a polytetrafluoroethylene material.

3. The structure according to claim 2, wherein the polytetrafluoroethylene material contains light uniformizing particles.

4. The structure according to claim 1, wherein the structure is configured to increase a receiving angle of the optical sensor.

5. A handheld device, comprising:
   a casing;
   touchscreen glass at an outside surface of the casing;
   an ambient light hole provided on the touchscreen glass;
   a main board;
   an optical sensor disposed between the touchscreen glass and the main board; and
   a light uniformizing film disposed between the touchscreen glass and the optical sensor, the light uniformizing film in contact with the touchscreen glass and completely covering the ambient light hole.

6. The handheld device according to claim 5, wherein the device is designed to increase a receiving angle of the optical sensor.

7. The handheld device according to claim 5, wherein the touchscreen glass is embedded in the casing.

8. The handheld device according to claim 7, wherein the optical sensor is fixed inside the casing.

9. The handheld device according to claim 5, wherein the light uniformizing film contains a polytetrafluoroethylene material.

10. The handheld device according to claim 9, wherein the polytetrafluoroethylene material contains light uniformizing particles.

11. The handheld device according to claim 5, further comprising a liquid crystal display within the casing adjacent the touchscreen glass.

12. The handheld device according to claim 5, wherein the handheld device comprises a handheld terminal.

13. A method comprising:
   collecting, by a light uniformizing film, incident external ambient light passing through touchscreen glass;
   conducting the incident external ambient light to an optical sensor; and
   controlling, by the optical sensor, brightness of a liquid crystal display according to intensity of the collected light.

14. The method according to claim 13, wherein controlling the brightness of the liquid crystal display comprises:
   determining brightness data corresponding to the intensity of the collected light according to preset correspondence between light intensity and brightness; and
   adjusting the brightness of the liquid crystal display according to the brightness data.

15. The method according to claim 13, wherein the light uniformizing film contains a polytetrafluoroethylene material.

16. The method according to claim 15, wherein the polytetrafluoroethylene material contains light uniformizing particles.

17. The method according to claim 13, wherein the liquid crystal display is part of a handheld terminal.

* * * * *